No. 723,014. PATENTED MAR. 17, 1903.
E. OFFENBACHER.
MANUFACTURE OF STRENGTHENED GLASS PLATES OR SUPPORTS.
APPLICATION FILED FEB. 4, 1902.
NO MODEL.
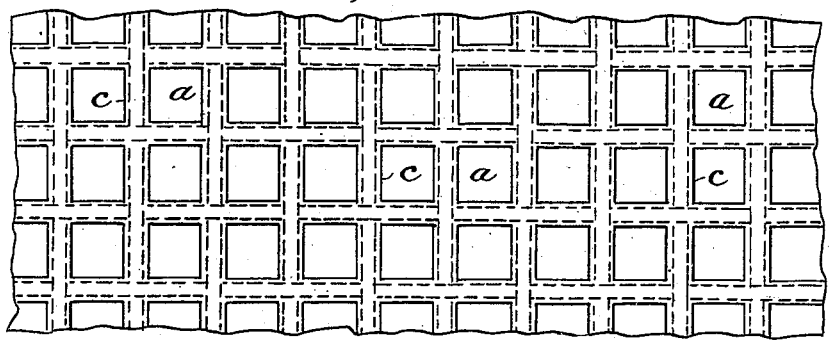
Fig. 1.
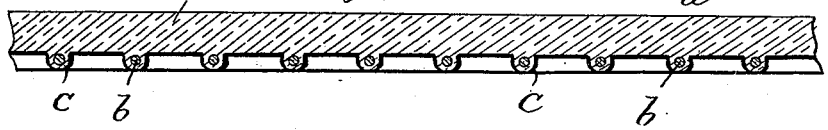
Fig. 2.
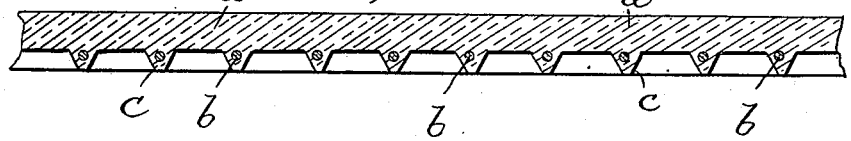
Fig. 3.
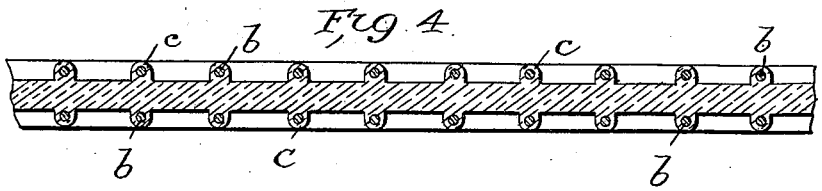
Fig. 4.
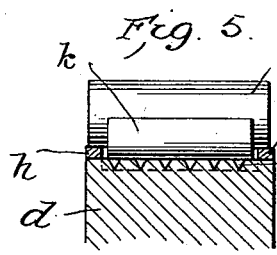
Fig. 5.
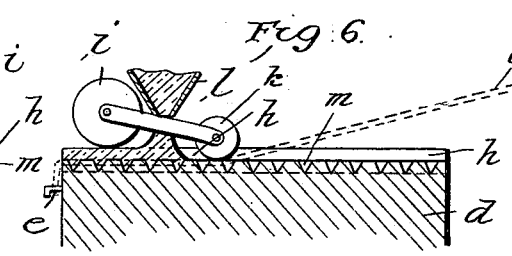
Fig. 6.
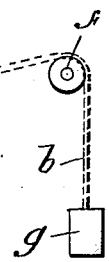
Attest:
C. S. Middleton
Walter Donaldson
Inventor:
Emil Offenbacher
by Richards
attys.
THE NORRIS PETERS CO., PHOTO-LITHO., WASHINGTON, D. C.

UNITED STATES PATENT OFFICE.

EMIL OFFENBACHER, OF MARKT REDWITZ, GERMANY.

MANUFACTURE OF STRENGTHENED GLASS PLATES OR SUPPORTS.

SPECIFICATION forming part of Letters Patent No. 723,014, dated March 17, 1903.

Application filed February 4, 1902. Serial No. 92,565. (No model.)

*To all whom it may concern:*

Be it known that I, EMIL OFFENBACHER, a subject of the Emperor of Germany, residing at Markt Redwitz, Bavaria, Germany, have invented certain new and useful Improvements in the Manufacture of Strengthened Glass Plates or Supports, of which the following is a specification.

This invention has for its object an improved kind of support or strengthened plates formed of glass which are characterized by great strength and great power of transmitting light. The glass plates are provided on one or both sides with a wire mesh or net fixed to the glass tablets or slabs by means of a thin layer of glass surrounding the separate wires in such a way that by this glass layer ribs are formed on the surface of the glass plate, inside which ribs the wires of the wire net run. This arrangement has the advantage that the glass slab rests to a certain extent on the wire network, more particularly on the under network, and is supported thereby, so that the glass tablet has a very considerable supporting power. The reason of this is that the weight is sustained directly in this improved plate by the wire network. A further advantage of these carrying-plates as against the glass plates with wire insertions hitherto known is to be seen in that the strains caused in the known glass-wired plates by the difference of the contraction of the wire and glass material when the plate is cooling do not exist in this improved plate or in any case do not diminish the strength and power of support of the same to anything like the former extent, as the wire network is not embedded in the glass slab, but only in the ribs on the same, and thus strains in the worst case only arise in the thin layers of glass directly surrounding the wires, which are immaterial as regards the capability of support of the glass slabs. As regards the holding together of the separate pieces of glass in the case of breakage of the glass slab this improved arrangement affords not only equal advantages to the wired glass hitherto employed in which a fabric is embedded in the center, but in this improved plate the further valuable property exists that the falling of a portion of the layer of glass such as not unfrequently took place in the previous form of wired glass from the part situated beneath the wire network is impossible.

This improved support-plate is shown in Figures 1 to 4 of the accompanying drawings in three forms of construction, while Figs. 5 and 6 show the method of making the same.

The support-plate $a$ shown in Fig. 1 in a view from beneath and Fig. 2 a cross-section is only provided with a wire network $b$ on its under side. The separate wires of the network are closely surrounded by thin layers of glass $c$, so that the latter form projecting ridges or ribs on the under surface of the glass plate, which ribs inclose the wire network, and the separate parts of which have an approximately semicircular section. In the form of construction of the plate shown in Fig. 3, however, the bars $c$ have a triangular section, and Fig. 4 shows a plate provided with a wire net on both sides.

The manufacture of a strengthening or supporting plate such as is shown, for instance, in Fig. 3 may take place in the manner demonstrated in Figs. 5 and 6 by rolling out on a table $d$ the mass of glass while still in a plastic condition, the surface of said table being provided with furrows or grooves $m$, corresponding in form to the wire network $b$. One end of the wire network $b$ is attached to one side of the rolling-table by means of hooks or the like $e$. At the other end the wire network is carried over a roller $f$ and held taut by means of a weight $g$. The rolling-table is provided with bars $h$ at both sides, on which a larger roller $i$ travels, said roller serving for spreading the mass of glass. In front of the larger roller a smaller roller $k$ is arranged, which travels directly on the rolling-table, said smaller roller pressing the meshes of the wire network into the corresponding furrows $m$ of the rolling-table. The mass of glass is poured onto the rolling-table between the two rollers by means of a hopper or funnel $l$, so that it is rolled out by the larger roller into a glass plate or slab, the thickness of which corresponds to the height of the bars $h$. The glass mass is thus pressed into the furrows $m$ of the rolling-table and surrounds the wire network in a thin layer, which network is held in the furrows by the stretching device $g$. The plate thus formed has, in addition to its great power of resistance, the further advantage of a very good transmission of light, as on one side the ribs *c* on account of their contraction when cooling come out of contact with the rolling-table or rather with the bottom of the furrows, and thus have a perfectly-smooth surface, while, on the other hand, the plates themselves, even in the flattening-oven, do not, as hitherto, rest with their whole surface on the bed, but only with the ribs, and therefore when being flattened do not become clouded.

By "fabric" there may be understood within the meaning of the present specification also loose wires running parallel to one another, which are connected in the manner hereinbefore described with the glass plate, and thereby also with one another.

The production of a supporting-plate provided with a wire net on both sides, as in Fig. 4, can also result from using the mechanism illustrated in Figs. 5 and 6. For this purpose on the surface of the cylinder *i* furrows or grooves are formed in the same manner as on the surface of the table *d*. In this case also there should be disposed near the cylinder *i* a feed apparatus for the wire net, to be embedded in the upper side of the plate. By means of this feed apparatus the wire net can be conveyed to the surface of the cylinder *i* in such a manner as to be placed in the furrows or grooves of the cylinder's surface. In rolling out the glass the latter enters the furrows of the cylinders, and thus encircles the upper wire net in exactly the same manner as in the case of the lower side of the glass plate with the lower wire net.

I declare that what I claim is—

A strengthened glass plate or support in which said plate is provided on one or both sides with a wire cover *b* the separate wires of which are incased by a thin layer *c* of the mass of glass said layer *c* being in the form of a rib projecting from the face of the glass plate substantially as described.

In witness whereof I have hereunto set my hand in presence of two witnesses.

EMIL OFFENBACHER.

Witnesses:
WOLDEMAR HAUPT,
HENRY HASPER.